(12) United States Patent
Wang et al.

(10) Patent No.: US 11,231,139 B2
(45) Date of Patent: Jan. 25, 2022

(54) DETECTING AND REPAIRING METHOD FOR EXTERNAL DISEASES OF BURIED DRAINAGE PIPELINE

(71) Applicants: Infrastructure Renewal Institute of Southern China, Guangdong (CN); WELEAD Infrastructure Engineering Technology (Zhengzhou), Ltd., Henan (CN)

(72) Inventors: Fuming Wang, Guangdong (CN); Hongyuan Fang, Guangdong (CN); Peng Zhao, Henan (CN); Yanhui Pan, Henan (CN); Bin Li, Henan (CN); Hang He, Henan (CN)

(73) Assignees: Infrastructure Renewal Institute of Southern China, Guangdong (CN); WELEAD Infrastructure Engineering Technology (Zhengzhou), Ltd., Henan (CN)

( * ) Notice: Subject to any disclaimer, the term of this patent is extended or adjusted under 35 U.S.C. 154(b) by 0 days.

(21) Appl. No.: 16/858,733

(22) Filed: Apr. 27, 2020

(65) Prior Publication Data
US 2020/0300404 A1     Sep. 24, 2020

(30) Foreign Application Priority Data

Sep. 29, 2019   (CN) .......................... 201910933411.9

(51) Int. Cl.
*F16L 55/16*         (2006.01)
*F16L 55/175*        (2006.01)
(Continued)

(52) U.S. Cl.
CPC ............. *F16L 55/175* (2013.01); *F16L 55/48* (2013.01); *F16L 55/12* (2013.01); *F16L 55/30* (2013.01); *F16L 55/46* (2013.01); *F16L 2101/30* (2013.01)

(58) Field of Classification Search
CPC ......... F16L 55/175; F16L 55/48; F16L 55/12; F16L 55/30; F16L 55/46; F16L 2101/30
(Continued)

(56) References Cited

U.S. PATENT DOCUMENTS 4,272,984 A * 6/1981 Bell .................... G01M 3/2823
                                                   138/90
6,348,869 B1 * 2/2002 Ashworth ............... F16L 55/44
                                                   340/605
(Continued)

*Primary Examiner* — James F Hook

(57) ABSTRACT

A method for detecting and repairing external diseases of a buried drainage pipeline includes steps of: S1, controlling a robot to enter the pipeline to perform comprehensive detection of pipeline diseases; S2, analyzing detected pipeline diseases with a computer terminal based on detection results of the robot, and determining locations of external diseases of the pipeline; S3, controlling the robot to detect a depth of the external diseases of the pipeline relative to a ground surface; S4, determining a projection position of the external diseases of the pipeline on the ground surface according to detection results of the step S2, and drilling a hole from the ground surface; determining a drilling depth according to detection results of the step S3, and inserting a grouting pipe; and S5, grouting and repairing the external diseases of the pipeline through the grouting pipe.

15 Claims, 3 Drawing Sheets

(51) Int. Cl.
     *F16L 55/48*      (2006.01)
     *F16L 55/12*      (2006.01)
     *F16L 55/30*      (2006.01)
     *F16L 55/46*      (2006.01)
     *F16L 101/30*      (2006.01)

(58) Field of Classification Search
     USPC .................................. 138/99, 93; 405/184.1
     See application file for complete search history.

(56)                References Cited

U.S. PATENT DOCUMENTS

| | | | |
|---|---|---|---|
| 2004/0175235 A1* | 9/2004 | Whittaker | F16L 55/265 |
| | | | 405/51 |
| 2005/0115337 A1* | 6/2005 | Tarumi | G01N 22/02 |
| | | | 73/865.8 |
| 2007/0258773 A1* | 11/2007 | Bennett | F16L 55/48 |
| | | | 405/184.1 |
| 2011/0196534 A1* | 8/2011 | Ekes | F17D 5/00 |
| | | | 700/259 |
| 2016/0169435 A1* | 6/2016 | Wang | F16L 55/175 |
| | | | 405/184.1 |
| 2019/0293225 A1* | 9/2019 | Richards, Jr. | F16L 55/1683 |

\* cited by examiner

DETECTING AND REPAIRING METHOD FOR EXTERNAL DISEASES OF BURIED DRAINAGE PIPELINE

CROSS REFERENCE OF RELATED APPLICATION

The present invention claims priority under 35 U.S.C. 119(a-d) to CN 201910933411.9, filed Sep. 29, 2019.

BACKGROUND OF THE PRESENT INVENTION

Field of Invention

The present invention relates to a technical field of detection and repair of drainage pipeline diseases, and more particularly to a method for detecting and repairing to external diseases of a buried drainage pipeline.

Description of Related Arts

As the "underground aorta" of modern cities, urban underground pipeline networks bear important responsibilities such as pollution discharge and water drainage, which play a pivotal role in the daily lives of urban residents. With the acceleration of China's urbanization process, construction scale of urban underground pipeline networks is also increasing. As of 2017, length of urban drainage pipes in China has exceeded 630,000 km. However, with the continuous increase of service life, the pipelines are seriously aging and in disrepair, wherein external diseases such as leakage, void, and incompactness are common. Therefore, how to quickly and accurately identify the defects in existing pipelines and repair them is one of the engineering problems that need to be solved urgently.

Conventionally, pipeline disease detection methods mainly comprise closed-circuit television (CCTV) detection, sonar detection, and pipeline periscope detection. Among them, the method of CCTV and pipeline periscope detection are used to judge the internal diseases of the pipeline by shooting videos inside the pipeline, wherein water supply needs to be stopped during the detection. Such methods can accurately identify the diseases of the pipeline structure itself, but cannot detect the external diseases of the pipeline. The sonar detection uses ultrasound signal to detect structural damages of the pipeline, wherein there is no need to stop water supply, but the method still cannot detect the external diseases of the pipeline.

The conventional repair methods for pipelines are mainly divided into two categories. The first is excavation repair. Such repair can cure internal and external pipeline diseases, but the construction speed is slow, the traffic impact is large, the cost is high, a lot of construction waste is generated, and the environment is polluted. The second is non-excavation repair. Main technologies thereof comprise pipeline penetration method, cured-in-place pipe (CIPP) method, pipe crushing method, winding method, grouting method, etc. Compared with conventional excavation repair, non-excavation repair has faster construction speed, lower cost, smaller impact on the environment, etc. However, the non-excavation repair methods such as the pipeline penetration method, the cured-in-place pipe (CIPP) method, the pipe crushing method and the winding method can only repair the damage of the pipeline structure itself, and cannot effectively repair the external diseases of the pipeline. Furthermore, secondary diseases may occur after the repair. Although the grouting method can effectively reinforce the soil around the pipeline and fill the void, but the external diseases cannot be accurately identified and located due to limitations of detection conditions, which affects grouting repair effect.

Therefore, conventional pipeline disease detection methods cannot accurately, identify the external diseases of buried pipelines, and most of the conventional repair methods aim for the pipeline structure itself. During repairing external diseases, the pipeline will usually be destroyed again. The external diseases of the pipeline cannot be accurately repaired without causing secondary diseases. Furthermore, conventional repair methods cannot accurately repair the diseased position, pipeline detection and repair are often performed separately in the prior art. There is an urgent need to develop non-destructive detection and refined synchronous grouting repair for external diseases of buried drainage pipelines.

Chinese patent application CN 201910463562.2 disclosed a method for minimally invasive repairing of underground drainage pipelines through rapid pipeline replacement, comprising steps of: determining defect sections, checking by CCTV, positioning of a short-circuited surface of defect sections, drilling out a top structural layer of a pipe, manually excavating soil around the pipe, removing the defect sections, replacing with new pipe under CCTV monitoring correction, sealing and stabilizing at an interface of the new and old pipes, filling with foam cement lime around the pipe, restoring a pavement base layer and filling back and tamping the soil layer by layer, checking repaired positions by CCTV, using spot-shaped cured-in-place pipe to fix a repairing airbag to a fiberglass cloth to press and cure at a lining interface, checking quality of cured lining at the interface of the new and old pipes, and restoring other structural layers of a road. The method removes the top structural layer of the pipe during drilling. The method is used to repair the defects on the pipeline, which is different from the detection and repair of external diseases of the pipeline according to the present invention.

Chinese patent application CN 201710223542.9 disclosed a non-excavation repair method for underground pipelines and inspection wells, comprising specific steps of: S1: cleaning, S2: detecting, S3: drying, S4: preparing repair materials, S5: repairing, S6: drying again, S7: cooling, S8: monitoring, and S9: performing acceptance. The method only disclosed that a damaged position of the underground pipeline and the inspection well can be detected by a robot in the step S2, but repair steps after detection are complicated and only damage inside the pipeline is repaired, which is different from the detection and repair of external diseases of the pipeline according to the present invention.

SUMMARY OF THE PRESENT INVENTION

An object of the present invention is to provide a method for detecting and repairing external diseases of a buried drainage pipeline, so as to solve the problem that conventional detection and repair methods for pipeline disease cannot accurately detect and repair external diseases of buried pipelines.

Another object of the present invention is to provide a method for detecting and repairing external diseases of a buried drainage pipeline Accordingly, in order to accomplish the above objects, the present invention provides a method for detecting and repairing external diseases of a buried drainage pipeline, comprising steps of:

S1, controlling a robot to enter the pipeline to perform comprehensive detection of pipeline diseases;

S2, analyzing detected pipeline diseases with a computer terminal based on detection results of the robot, and determining locations of external diseases of the is pipeline according to internal diseases of the pipeline located inside an external wall of the pipeline and the external diseases of the pipeline located outside the external wall of the pipeline;

S3, controlling the robot to detect a depth of the external diseases of the pipeline relative to a ground surface;

S4, determining a projection position of the external diseases of the pipeline on the ground surface according to detection results of the step S2, and drilling a hole from the ground surface; determining a drilling depth according to detection results of the step S3, and inserting a grouting pipe; and S5, grouting and repairing the external diseases of the pipeline through the grouting pipe.

Preferably, the step S1 further comprises steps of: putting an airbag into an upstream of the pipeline to block upstream water before the robot enters the pipeline through an inspection well.

Preferably, in the step S2, the robot is provided with a radar antenna; the radar antenna detects locations of the pipeline diseases, and compares the locations of the pipeline diseases with a location of a pipeline wall, so as to determine whether the pipeline diseases are the internal diseases or the external diseases of the pipeline.

Preferably, the robot comprises running wheels, a holding plate provided on the running wheels, a slide bar shaft which is vertically and rotatably provided on the holding plate, a slide bar capable of swinging in a vertical plane at a top of the slide bar shaft, a telescopic rod connected to the slide bar, and a mechanical arm capable of swinging in a horizontal plane at an end of the telescopic rod, wherein the radar antenna is provided at an end of the mechanical arm.

Preferably, the step S2 further comprises steps of: moving the radar antenna to be close to the pipeline wall after detecting the locations of the external diseases of the pipeline, and performing second detection of the external diseases of the pipeline to further confirm the locations of the external diseases of the pipeline.

Preferably; in the step S2, the robot is provided with a camera to obtain photos and videos inside the pipeline; a ground terminal synchronously determines internal disease conditions of the pipeline according to the photos and the videos.

Preferably, in the step S3, an acoustic wave signal transmitter is provided at an end of the mechanical arm of the robot; according to the locations of the external diseases of the pipeline detected in the step S2, an acoustic wave signal receiver is set on the ground surface directly above the external diseases of the pipeline; the depth of the external diseases of the pipeline relative to the ground surface is detected by the acoustic wave signal transmitter and the acoustic wave signal receiver.

Preferably, in the step S4, a hand-held drilling rig is used to drill the hole into ground; a scale is provided on a drill pipe of the hand-held drilling rig, and the drilling depth is controlled according to the scale to not exceed the depth of the external diseases of the pipeline.

Preferably, in the step S4, when the external diseases of the pipeline are located on a bottom side of the pipeline; holes are drilled vertically from the ground surface at two sides along a radial direction of the pipeline and are tangent to the pipeline; slurry in the grouting pipe reaches the locations of the external diseases of the pipeline through splitting a weak zone at the locations of the external diseases.

Preferably, the method further comprises a step S6 after the step S5: controlling the robot to detect an external diseased portion of the pipeline through the radar antenna again, and judging whether a repair effect of the external diseased portion of the pipeline is satisfied; if not, performing grouting and repairing again.

Compared with the prior art, the beneficial effects of the present invention are as follows.

First, the detection and repair method according to the present invention adopts advanced detection means and rigorous detection steps, realizing accurate identification and location of external disease locations, and solving the problem that conventional method is difficult to accurately detect the concealed external diseases. Second, simultaneous drilling and grouting repair are performed simultaneously after detection on the ground location corresponding to the diseases, archiving integrated construction of detection and grouting repair, which improves work efficiency and is convenient for popularization and application. Furthermore, the method will not damage the pipeline from inside to repair the disease outside the pipeline and will not cause secondary damage to the pipeline, just minimally invasive damage to the pavement. Meanwhile, the detection and repair method is not limited by pipe diameter, which has fast construction speed and little interference to traffic, so as to effectively solve the problem that conventional method is difficult to detect and repair the concealed external diseases, and promote the progress of China's buried pipeline maintenance technology.

BRIEF DESCRIPTION OF THE DRAWINGS

In order to more clearly explain the embodiments of the present invention or the technical solutions in the prior art, the drawings used in the description of the embodiments or the prior art will be briefly introduced below. Obviously, the drawings in the following description are merely some embodiments of the present invention. For those of ordinary skill in the art, other drawings can be Obtained based on the structure shown in the drawings without creative labor.

Figure 1:
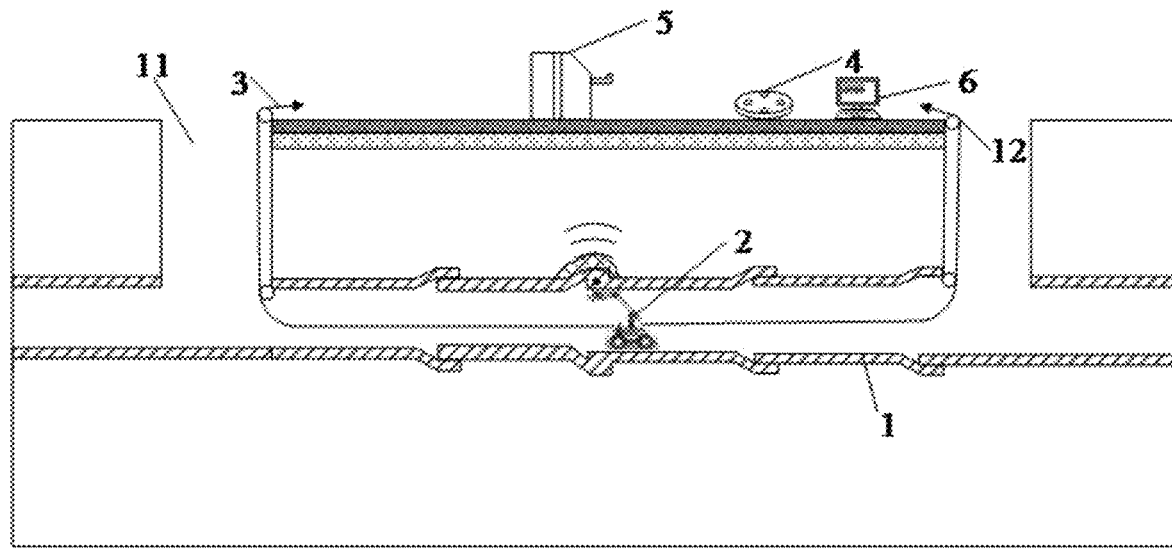
FIG. 1 illustrates detecting pipeline diseases with a radar antenna according to an embodiment of the present invention.

Element reference: 1—pipelent, 2—robot, 3—traction rope, 4—ground operation system, 5—radar signal receiver, 6—computer terminal, 7—hand-held drilling rig, 8—grouting pipe, 9—acoustic wave signal receiver, 10—polymer grouting system, 11—inspection well, 12—pulley set, 13—radar antenna, 14—acoustic wave signal transmitter, 15—mechanical arm, 16—telescopic rod. 17—slide bar, 18—slide bar shaft, 19—camera, 20—camera shaft, 21—holding plate, 22—running wheel, 23—feed pipe, 24—main air inlet pipe, 25—air pump, 26—material tank, 27—console, 28—heating insulation material pipe, 29—high-pressure foaming gun.

DETAILED DESCRIPTION OF THE PREFERRED EMBODIMENT

Technical solutions according to embodiments of the present invention will be clearly and completely described below with reference to the accompanying drawings. Obviously, the described embodiments are only a part of all embodiments of the present invention. Based on the embodiments of the present invention, all other embodiments can be obtained by those of ordinary skill in the art without creative efforts. Such other embodiments shall fall within the protection scope of the present invention.

It should be noted that all directional indications (such as up, down, left, right, front, back, . . . ) in the embodiments of the present invention are only used to explain relative positional relationship, motion situation and the like of components in a certain posture (as shown in the drawings). If the specific posture changes, the directional indication also changes accordingly.

In addition, the descriptions of "first", "second", and the like in the present invention are used for the purpose of description only, and are not to be construed as indicating or implying their relative importance or implicitly indicating the number of technical features. Thus, features defined with "first" or "second" may include at least one of the features, either explicitly or implicitly. Therefore, the features defined as "first" and "second" may explicitly or implicitly include at least one of the features. In the description of the present invention, the meaning of "multiple" is at least two, for example, two, three, etc., unless it is specifically defined otherwise.

In the present invention, the terms "connected" and "fixed" shall be understood in a broad sense unless otherwise specified and defined. For example, "fixed" may be a fixed connection, a detachable connection, or an integral body. It can be a mechanical connection or an electrical connection. It can be directly connected or indirectly connected through an intermediate medium. It can be the internal connection of two elements or the interaction between two elements, unless it is clearly defined otherwise. For those of ordinary skill in the art, the specific meanings of the above terms in the present invention can be understood according to specific situations.

In addition, the technical solutions according to the embodiments of the present invention can be combined with each other, but must be based on those that can be implemented by persons skilled in the art. When the combination of technical solutions conflicts or cannot be achieved, such a combination of technical solutions should be considered that it does not exist and is not within the scope of protection claimed by the present invention.

The present invention provides a method for detecting and repairing external diseases of a buried drainage pipeline.

Figure 2:
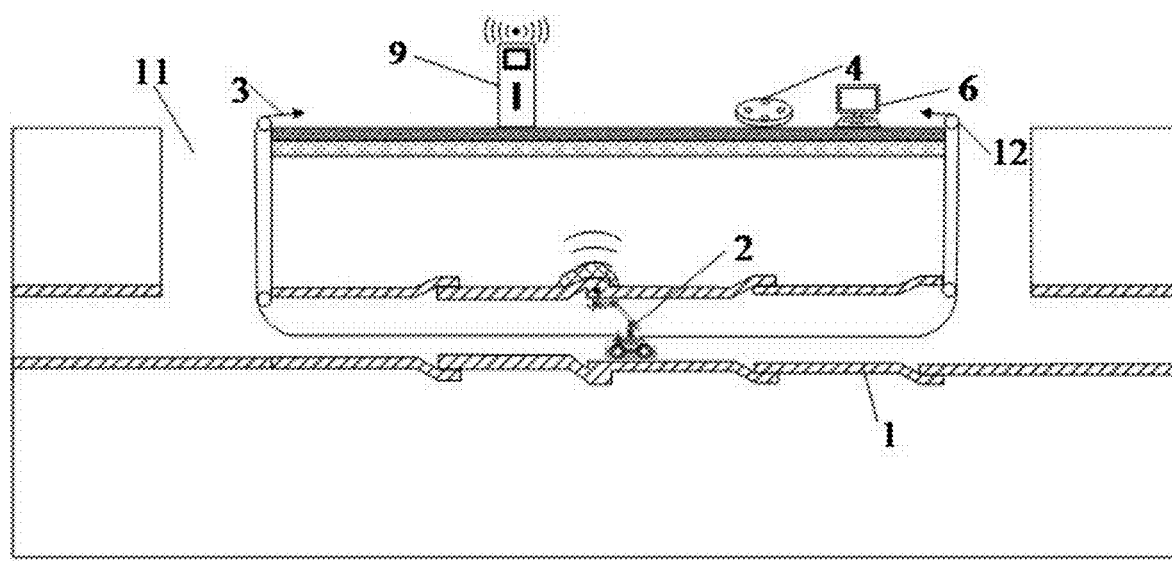
FIG. 2 illustrates detecting a depth of diseased locations relative to a ground surface with an acoustic wave signal transmitter and an acoustic wave signal receiver according to the embodiment of the present invention.
Figure 3:
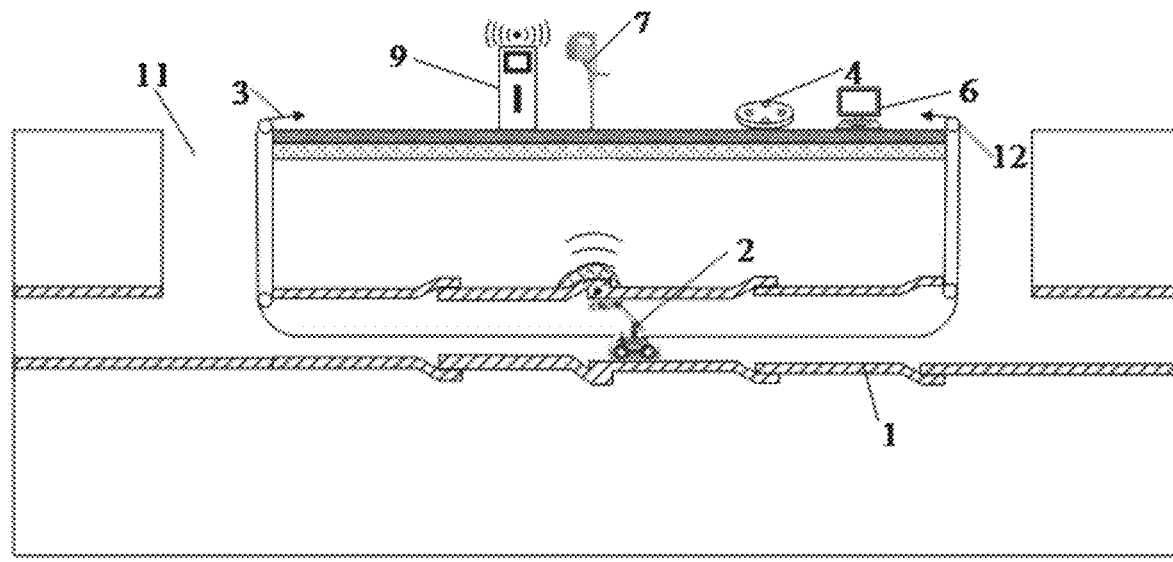
FIG. 3 illustrates drilling a hole from the ground surface with a hand-held drilling rig according to the embodiment of the present invention.
Figure 4:
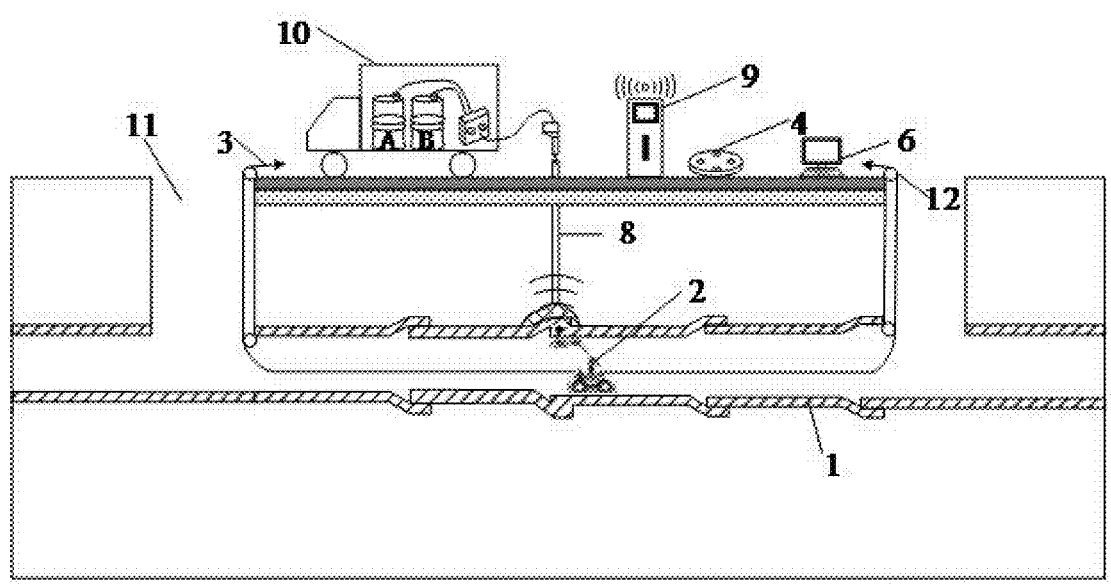
FIG. 4 illustrates fine grouting with a polymer grouting system according to the embodiment of the present invention.
Figure 5:
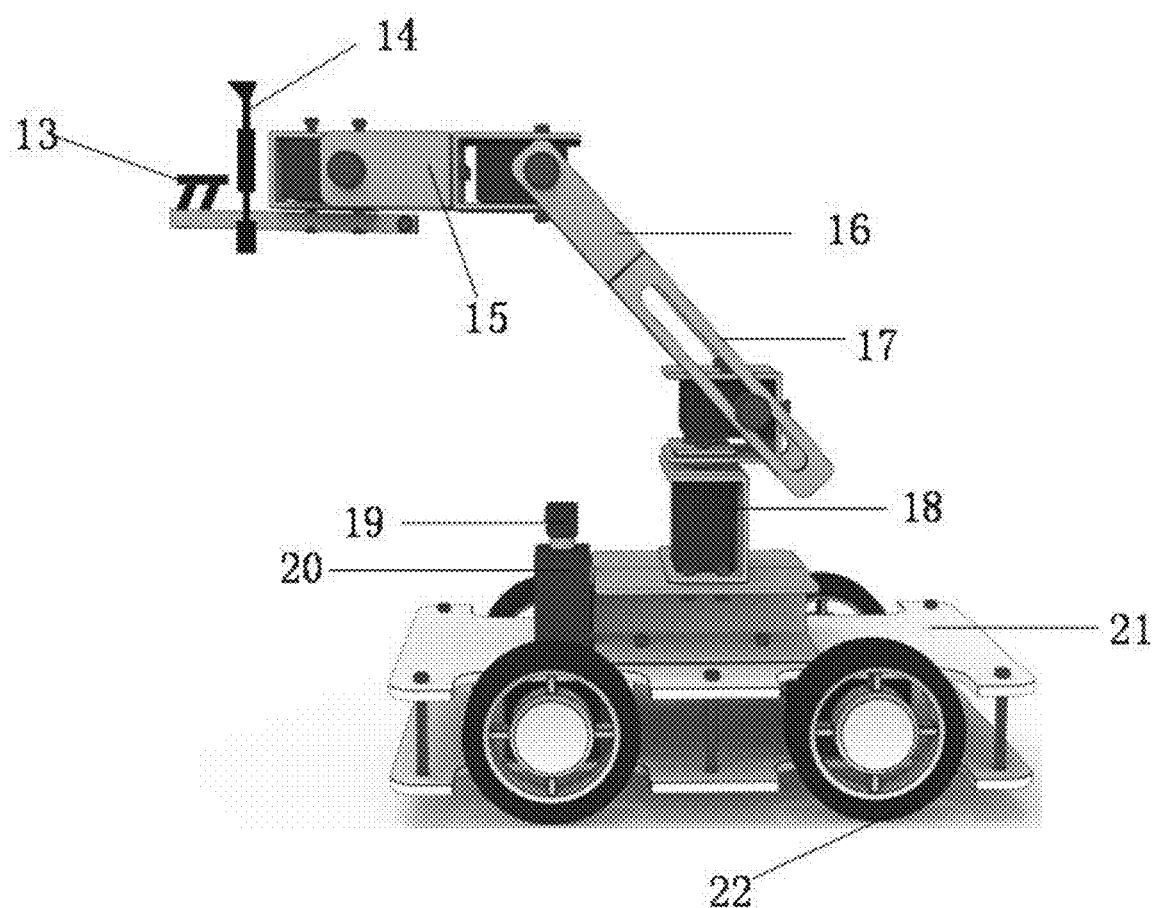
FIG. 5 is a structural view of a robot according to the embodiment of the present invention.
Figure 6:
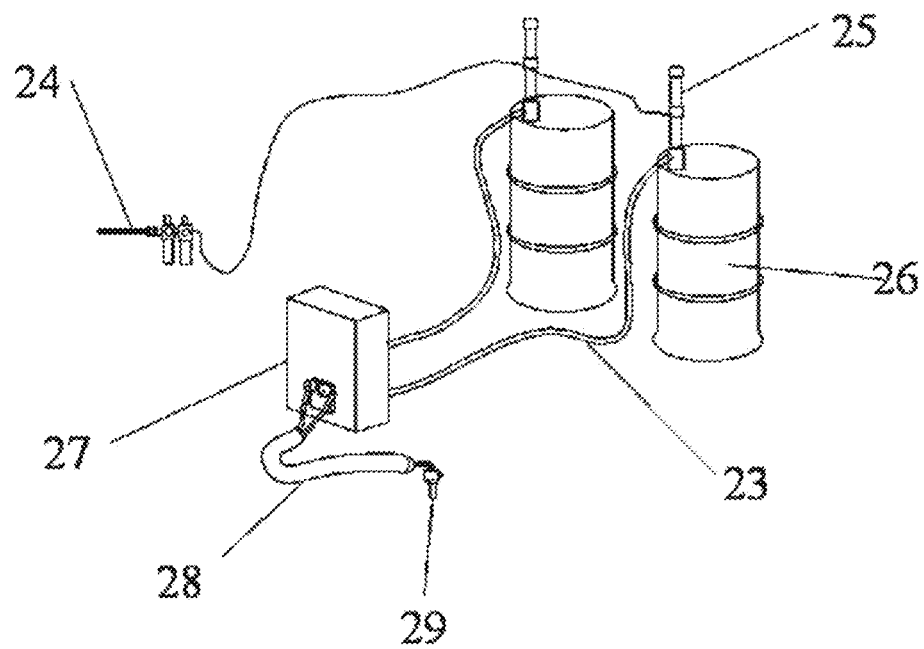
FIG. 6 is a structural view of the polymer grouting system of the present invention.

Referring to FIGS. 1-6, inspection wells 11 are provided at upstream and downstream of the pipeline 1. A robot 2 for detecting pipeline diseases is provided in the pipeline 1. A traction rope 3 passes through the pipeline 1. Pulley sets 12 are set up on walls of the two inspection wells 11. The traction rope 3 is connected to a ground surface through the pulley sets 12 and is used to move the robot 2 in the pipeline 1. A ground operating system 4 is provided on the ground and wirelessly communicates with the robot 2. A radar signal receiver 5, a computer terminal 6, a hand-held drilling rig 7, an acoustic wave signal receiver 9 and a polymer grouting system 10 are also provided on the ground surface.

A holding system composed of running wheels 22 and a holding plate 21 is provided at a bottom of the robot 2. A slide bar shaft 18 is vertically and rotatably provided on the holding plate 21, a slide bar 17 capable of swinging in a vertical plane is provided at a top of the slide bar shaft 18, a telescopic rod 16 is connected to the slide bar 17 and is telescopic relative to the slide bar 17, and a mechanical arm 15 capable of swinging in a horizontal plane is provided at an end of the telescopic rod 16. A radar antenna 13 and an acoustic wave signal transmitter 14 are provided at an end of the mechanical arm 15. The robot 2 wirelessly communicates with the ground operating system 4 and can be controlled to start or stop on the ground surface. The ground operating system 4 can also be used to control movement of the mechanical arm 15, so as to remotely adjust positions of the radar antenna 13 and the acoustic wave signal transmitter 14 in the pipeline 1. The mechanical arm 15 can be telescopically moved up and down by the telescopic rod 16, and can also be rotated 360 degrees by swinging the mechanical arm 15, so that suitable height and angle can be selected for the radar antenna 13 and the acoustic wave signal transmitter 14 for detection.

The radar signal receiver 5 communicates with the radar antenna 13 on the robot 2, and the acoustic wave signal receiver 9 communicates with the acoustic wave signal transmitter 14 on the robot 2. The radar signal receiver 5 and the acoustic wave signal receiver 9 are connected to the computer terminal 6, and send received signals to the computer terminal 6 for processing.

The robot 2 is also provided with a camera 19, which can be rotated 360 degrees through a camera shaft 20 for real-time 360-degree shooting in the pipeline 1. The robot 2 also transmits captured image information and video information to the computer terminal 6 in real time.

Understandably, in other embodiments, the robot 2 may also be a conventional pipeline robot that specializes in detecting pipeline diseases.

The polymer grouting system 10 comprises a feed pipe 23, a main air inlet pipe 24, an air pump 25, a material tank 26, a console 27, a heating insulation material pipe 28 and a high-pressure foaming gun 29. The main air inlet pipe 24 communicates with the air pump 25, and the air pump 25 is arranged on the material tank 26. The material tank 26 communicates with the heating insulation material pipe 28 through the feed pipe 23. A console 27 is provided between the feed tube 23 and the heating insulation material pipe 28. An end of the heating insulation material pipe 28 is connected to the high-pressure foaming gun 29. When the polymer grouting system 10 is used for grouting, the high-pressure foaming gun 29 communicates with a grouting port through a grouting pipe 8, and polymer slurry in the material tank 26 is transported to the heating insulation material pipe 28 through the feed pipe 23, and then is injected into the grouting pipe 8 through the high-pressure foaming gun 29 after heating. The grouting pipe 8 is connected to the grouting port, and the polymer slurry is injected into a diseased position through the grouting port to repair the pipeline diseases.

Based on the above-mentioned equipment, the present invention proposes a method for detecting and repairing external diseases of a buried drainage pipeline, which is used for non-destructive detection and fine synchronous grouting repair of external diseases such as void and non-compactness of municipal buried drainage pipelines. The method comprises steps of:

S1, entering the pipeline 1 from an inspection well 11 and putting an airbag into an upstream pipeline to block upstream water;

putting the robot 2 into the pipeline 1 through the inspection well 11, and using a traction rope to move the robot 2 in the pipeline 1;

controlling the robot 2 to perform 360-degree comprehensive detection in the pipeline 2 through a radar antenna 13;

S2, dividing pipeline diseases into pipeline internal diseases and pipeline external diseases according to occurrence locations, wherein the pipeline internal diseases and the pipeline external diseases are divided by an external surface of the pipeline (that is, an external contour of a pipeline wall) as a boundary; conventional repair technology usually targets pipeline internal diseases such as subsidence, corrosion, cracking, disjointness, misalignment, etc.; the pipeline external diseases occur outside the pipeline, and usually occur near the pipeline internal diseases, mainly comprising void, non-compactness and pipe top hollowing;

measuring locations of the pipeline diseases by different propagation speeds and time of electromagnetic waves emitted by a radar antenna 13 of the robot 2 in different media, wherein the robot 2 compares the locations of the pipeline diseases with a location of a pipeline wall, so as to determine whether the pipeline diseases are the internal diseases or the external diseases of the pipeline 1;

then moving the radar antenna 13 to be close to the pipeline wall after detecting the locations of the external diseases of the pipeline 1, and performing second detection of the external diseases of the pipeline 1 to further confirm the locations of the external diseases of the pipeline 1;

S3, setting an acoustic wave signal receiver 9 on the ground surface directly above the external diseases of the pipeline 1 according to the locations of the external diseases of the pipeline 1 detected in the step S2, wherein the depth of the external diseases of the pipeline 1 relative to the ground surface is detected by the acoustic wave signal transmitter 14 and the acoustic wave signal receiver 9;

S4, determining a projection position of the external diseases of the pipeline 1 on the ground surface according to detection results of the step S2, and using a hand-held drilling rig 7 to drill a hole into ground according to detection results of the step S3; wherein a scale is provided on a drill pipe of the hand-held drilling rig 7, and the drilling depth is controlled according to the scale to not exceed the depth of the external diseases of the pipeline, thereby avoiding further damage;

inserting a grouting pipe 8 through the hole;

S5, grouting and repairing the external diseases of the pipeline 1 through the grouting pipe 8 from the ground surface;

S6, controlling the robot 2 to detect an external diseased portion of the pipeline 1 through the radar antenna 13 again; and judging whether a repair effect of the external diseased portion of the pipeline 1 is satisfied; if not, performing grouting and repairing again.

In the present invention, the robot 2 is equipped with the radar antenna 13 and the acoustic wave signal transmitter 14 to detect the pipeline diseases. Positions of the radar antenna 13 and the acoustic wave signal transmitter 14 in the pipeline 1 can be adjusted by movement of the robot 2 and the mechanical arm, so as to selected suitable height and angle for comprehensive detection of the pipeline diseases. Through radar detection technology, various diseases such as void and leakage of concrete pipes, HDPE pipes and other drainage pipes can be accurately identified. Through analysis and processing by the computer terminal 6, the external diseases of the pipeline 1 can be detected according to the relative position between the pipeline diseases and the pipeline wall. After the second detection by the radar antenna to further confirm the locations of the external diseases of the pipeline 1, an acoustic wave signal is used to detect the depth of the external diseases of the pipeline 1, for drill to a certain depth from the ground surface. Then grouting repair is performed on the diseased position by the grouting system 10 through the grouting pipe 8.

Therefore, first; the detection and repair method according to the present invention adopts advanced detection means and rigorous detection steps, realizing accurate identification and location of external disease locations, and solving the problem that conventional method is difficult to accurately detect the concealed external diseases. Second, simultaneous drilling and grouting repair are performed simultaneously after detection on the ground location corresponding to the diseases, archiving integrated construction of detection and grouting repair, which improves work efficiency and is convenient for popularization and application, wherein synchronized detection and repair solves the problem that detection and repair in the prior art are usually performed separately. Furthermore; the method will not damage the pipeline from inside to repair the disease outside the pipeline and will not cause secondary damage to the pipeline, just minimally invasive damage to the pavement. Meanwhile, the detection and repair method is not limited by pipe diameter, which has fast construction speed and little interference to traffic, so as to effectively solve the problem that conventional method is difficult to detect and repair the concealed external diseases, and promote the progress of China's buried pipeline maintenance technology.

Preferably, in the step S2, in order to comprehensively detect the pipeline 1, the robot 2 moves a certain distance along an extension direction of the pipeline 1, and the mechanical arm 15 moves the radar antenna 13 to 360-degree scan the pipeline 1. After scanning, the robot 2 moves a short distance, and the radar antenna 13 performs another 360-degree scan. By repeating the cycle, the radar antenna 13 can obtain cross-section information of interior of the pipeline 1, of the pipeline wall, and of external soil of the pipeline 1 at different positions in the pipeline 1. Such information can be displayed on the computer terminal 6. Technician can determine the locations of the diseases from the cross-section information displayed, and synchronically compare the locations of the diseases with the location of the pipeline wall to determine which are the external diseases of the pipeline 1.

Preferably, in the step S4, when the external diseases of the pipeline 1 are located on a bottom side of the pipeline, namely near a underground side, holes are drilled vertically from a corresponding ground position at two sides along a radial direction of the pipeline, and the holes are tangent to the pipeline at the two sides; slurry in the grouting pipe reaches the locations of the external diseases of the pipeline through splitting a weak zone at the locations of the external diseases.

Preferably, in the step S2, the robot 2 is provided with a camera 19 to obtain photos and videos inside the pipeline 1; the computer terminal 6 can determine internal disease conditions of the pipeline 1 according to the photos and videos.

The above is only preferred embodiments of the present invention, and therefore does not limit the claimed scope of the present invention. Any equivalent structural transformation or direct/indirect application to other related technical fields based on the description and drawings of the present invention are with protection scope of the present invention.

What is claimed is:

1. A method for detecting and repairing external defects of a buried drainage pipeline, comprising steps of:
   S1, controlling a robot to enter the pipeline to perform comprehensive detection of pipeline defects;
   S2, analyzing detected pipeline defects with a computer terminal based on detection results of the robot, and determining locations of external defects of the pipeline according to internal defects of the pipeline located inside an external wall of the pipeline and the external defects of the pipeline located outside the external wall of the pipeline;
   S3, controlling the robot to detect a depth of the external defects of the pipeline relative to a ground surface;
   S4, determining a projection position of the external defects of the pipeline on the ground surface according to detection results of the step S2, and drilling a hole from the ground surface; determining a drilling depth according to detection results of the step S3, and inserting a grouting pipe; and
   S5, grouting and repairing the external defects of the pipeline through the grouting pipe.

2. The method, as recited in claim 1, wherein the step S1 further comprises steps of: putting an airbag into an upstream of the pipeline to block upstream water before the robot enters the pipeline through an inspection well.

3. The method, as recited in claim 1, wherein in the step S2, the robot is provided with a radar antenna; the radar antenna detects locations of the pipeline defects, and compares the locations of the pipeline defects with a location of a pipeline wall, so as to determine whether the pipeline defects are the internal defects or the external defects of the pipeline.

4. The method, as recited in claim 3, wherein the robot comprises running wheels, a holding plate provided on the running wheels, a slide bar shaft which is vertically and rotatably provided on the holding plate, a slide bar capable of swinging in a vertical plane at a top of the slide bar shaft, a telescopic rod connected to the slide bar, and a mechanical arm capable of swinging in a horizontal plane at an end of the telescopic rod, wherein the radar antenna is provided at an end of the mechanical arm.

5. The method, as recited in claim 4, further comprising a step S6 after the step S5:
   S6, controlling the robot to detect an external defect portion of the pipeline through the radar antenna again, and judging whether a repair effect of the external defect portion of the pipeline is satisfied; if not, performing grouting and repairing again.

6. The method, as recited in claim 4, wherein the step S2 further comprises steps of: moving the radar antenna to be close to the pipeline wall after detecting the locations of the external defects of the pipeline, and performing second detection of the external defects of the pipeline to further confirm the locations of the external defects of the pipeline.

7. The method, as recited in claim 6, further comprising a step S6 after the step S5:
   S6, controlling the robot to detect an external defect portion of the pipeline through the radar antenna again, and judging whether a repair effect of the external defect portion of the pipeline is satisfied; if not, performing grouting and repairing again.

8. The method, as recited in claim 6, wherein in the step S2, the robot is provided with a camera to obtain photos and videos inside the pipeline; a ground terminal synchronously determines internal defect conditions of the pipeline according to the photos and the videos.

9. The method, as recited in claim 8, further comprising a step S6 after the step S5:
   S6, controlling the robot to detect an external defect portion of the pipeline through the radar antenna again, and judging whether a repair effect of the external defect portion of the pipeline is satisfied; if not, performing grouting and repairing again.

10. The method, as recited in claim 6, wherein in the step S3, an acoustic wave signal transmitter is provided at an end of the mechanical arm of the robot; according to the locations of the external defects of the pipeline detected in the step S2, an acoustic wave signal receiver is set on the ground surface directly above the external defects of the pipeline; the depth of the external defects of the pipeline relative to the ground surface is detected by the acoustic wave signal transmitter and the acoustic wave signal receiver.

11. The method, as recited in claim 10, further comprising a step S6 after the step S5:
    S6, controlling the robot to detect an external defect portion of the pipeline through the radar antenna again, and judging whether a repair effect of the external defect portion of the pipeline is satisfied; if not, performing grouting and repairing again.

12. The method, as recited in claim 10, wherein in the step S4, a hand-held drilling rig is used to drill the hole into ground; a scale is provided on a drill pipe of the hand-held drilling rig, and the drilling depth is controlled according to the scale to not exceed the depth of the external defects of the pipeline.

13. The method, as recited in claim 12, further comprising a step S6 after the step S5:
    S6, controlling the robot to detect an external defect portion of the pipeline through the radar antenna again, and judging whether a repair effect of the external defect portion of the pipeline is satisfied; if not, performing grouting and repairing again.

14. The method, as recited in claim 10, wherein in the step S4, when the external defects of the pipeline are located on a bottom side of the pipeline, holes are drilled vertically from the ground surface at two sides along a radial direction of the pipeline and are tangent to the pipeline; slurry in the grouting pipe reaches the locations of the external defects of the pipeline through splitting a weak zone at the locations of the external defects.

15. The method, as recited in claim 14, further comprising a step S6 after the step S5:
    S6, controlling the robot to detect an external defect portion of the pipeline through the radar antenna again, and judging whether a repair effect of the external defect portion of the pipeline is satisfied; if not, performing grouting and repairing again.

* * * * *